J. Booth,
Brick Machine.

N°21,545.    Patented Sep. 21, 1858.

AM. PHOTO-LITHO. CO. N.Y. (OSBORNE'S PROCESS)

UNITED STATES PATENT OFFICE.

JOHN BOOTH, OF MOBILE, ALABAMA.

BRICK-MACHINE.

Specification of Letters Patent No. 21,545, dated September 21, 1858.

*To all whom it may concern:*

Be it known that I, JOHN BOOTH, of Mobile city, in the county of Mobile and State of Alabama, have invented a new and useful Improvement in Brick-Machines; and I do hereby declare that the following is a full, clear, and exact description of the same, reference being had to the annexed drawing, forming part of this specification, in the several figures of which similar characters of reference denote the same part.

Figure 4:
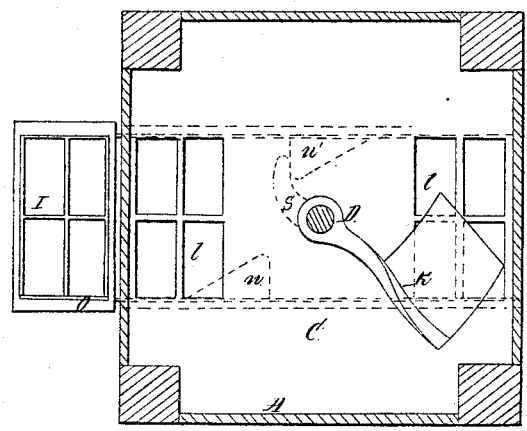
Figure 1:
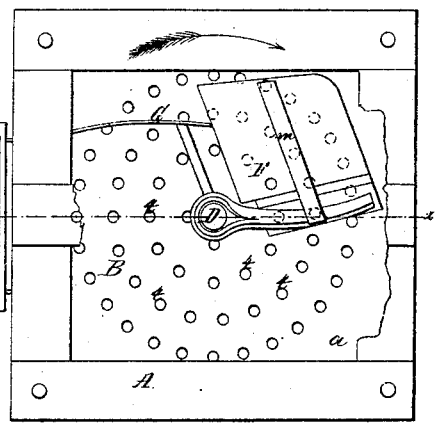
Figure 2:
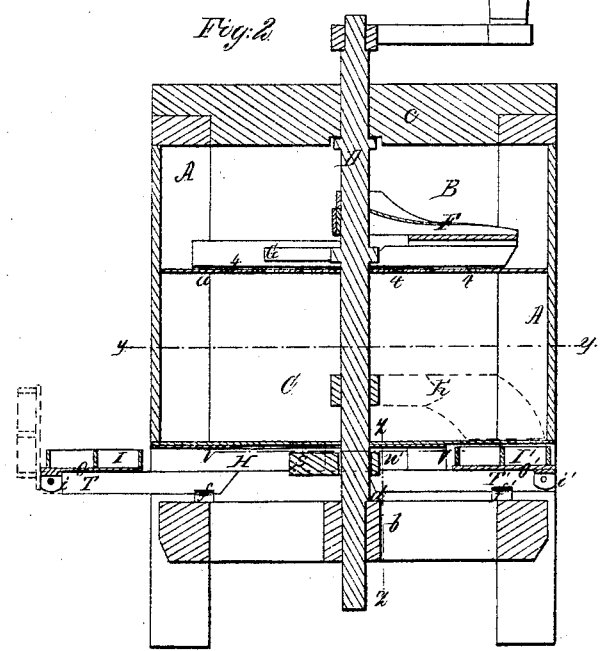
Figure 5:
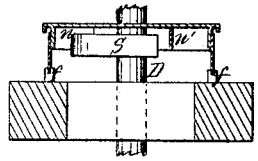
Figure 3:
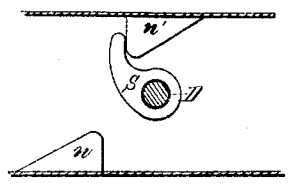

Figure 1, is a plan view of the machine. Fig. 2, is a vertical section on line $x\,x$. Fig. 3, is a horizontal section on line $y,\,y$. Fig. 4 is a vertical section on line $z\,z$ showing the cam operating the carriage. Fig. 5 is a horizontal section on line $v\,v$ showing projections on carriage.

The nature of my invention consists of a combination of devices for the purpose of making brick, as hereinafter to be described.

To enable others skilled in the art to make and use my invention I will proceed to describe its construction and operation as follows.

In the drawing A represents frame work of the machine. B chamber in which the clay is mixed and tempered for molding purposes. C chamber, in which the clay after it has been properly tempered is received through perforations $t$ in floor $a$. The chamber has openings $l$ in its bottom for the passage of the clay to the molds. D upright shaft stepped at $d$, and having its bearing in cross piece $b$, and is held in vertical position by cross piece $c$.

F is an inclined blade, hinged so that it can rise and fall as may be necessary; the lower edge of said blade being kept in contact with the perforated floor by spring $m$. This spring should be of sufficient strength to mash all clods, and force the clay through the openings $t$; at the same time allowing the blade to rise and run over anything that it cannot work off. G scraper which follows the inclined blade in its revolutions and by which all hard and foreign substances which cannot pass through the perforations $t$, are thrown to the sides of the chamber or box, and readily removed therefrom. K mold filler attached to shaft D, which revolving in chamber C fills the mold and passing over the same removes the surplus clay. H mold carriage carrying a mold I at each end, and moving the guides $f\,f'$. This carriage has a reciprocating motion produced by cam $s$ on shaft D acting upon the projections $n\,n'$. O O′, tilting platforms, upon which the molds I I′ are placed, and being hinged to the arms T T′ of carriage as at $i\,i'$, are readily given a perpendicular position to facilitate the removal of the molds, the arrangement being substantially as described and shown in drawing.

The operation of the machine is as follows:—The clay in its crude state is received into the chamber B, where it is subjected to the action of inclined blade F, which tempers and forces it through the perforations $t$ into the chamber C. Shaft D being revolved in direction of arrow, cam $s$ secured to shaft, acts upon the projection $n$, and causes the mold I′ to be brought in position as shown in drawing Fig. 2. When the mold filler K forces the clay through the openings $l$ in the bottom of chamber C into the mold, and completely fills it, causes it to be compact, and removes the surplus clay. The mold is then withdrawn by the action of cam $s$ upon the projection $n'$ as shown in Fig. 3, and platform O′ tilted to position shown in drawing Fig. 2, the mold sliding therefrom to a bench upon which it is stood on its edge until borne off to the yard where the bricks are to be dried, and the platform being tilted to horizontal position another mold is placed thereon and drawn under the clay box; the molds being alternately fed and delivered as above set forth.

What I claim as my invention and desire to secure by Letters Patent is—

The chambers B and C separated by the perforated floor $a$, in combination with the spring blade F, scraper K, and reciprocating mold carriage H; all constructed, arranged, and operating substantially as, and for the purpose set forth.

In testimony whereof, I have hereunto signed my name before two subscribing witnesses.

JOHN BOOTH.

Witnesses:
C. SALOM,
CHAS. MOORE.